(12) United States Patent
Ohtsuka et al.

(10) Patent No.: US 7,295,389 B2
(45) Date of Patent: Nov. 13, 2007

(54) LENS BARREL, IMAGE-PICKUP UNIT HAVING THE LENS BARREL, AND MANUFACTURING METHOD OF THE SAME

(75) Inventors: Katsumi Ohtsuka, Hachioji (JP); Tohru Horiuchi, Inagi (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/273,923

(22) Filed: Nov. 14, 2005

(65) Prior Publication Data

US 2006/0109570 A1 May 25, 2006

(30) Foreign Application Priority Data

Nov. 22, 2004 (JP) ............... 2004-337241
Nov. 25, 2004 (JP) ............... 2004-340261

(51) Int. Cl.
*G02B 7/02* (2006.01)
(52) U.S. Cl. .............. 359/819; 359/822; 359/821; 359/823
(58) Field of Classification Search ......... 359/819–825
See application file for complete search history.

(56) References Cited

U.S. PATENT DOCUMENTS

| | | | | |
|---|---|---|---|---|
| 6,078,438 A | * | 6/2000 | Shibata et al. ............ | 359/819 |
| 6,434,333 B2 | * | 8/2002 | Tanaka et al. ............ | 396/132 |
| 6,449,434 B1 | * | 9/2002 | Fuss ............ | 396/97 |
| 7,177,539 B2 | * | 2/2007 | Ito et al. ............ | 396/85 |
| 2002/0141081 A1 | * | 10/2002 | Onda ............ | 359/823 |

* cited by examiner

*Primary Examiner*—Scott J. Sugarman
*Assistant Examiner*—James R Greece
(74) *Attorney, Agent, or Firm*—Cohen Pontani Lieberman & Pavane LLP

(57) ABSTRACT

A lens barrel includes a lens group that conducts light from a subject, a lens shell that holds the lens group; a string-formed shape memory alloy element that moves the lens shell in a direction of an optical axis, and a pair of guide shafts formed approximately in parallel to the optical axis of the lens group, wherein the lens shell is integrally formed with a cylindrical portion through which one of the guide shafts penetrates, the string-formed shape memory alloy element contacts with a portion of the lens shell at an approximately central portion of the alloy element, and both ends of the alloy element are fixed at respective positions with a line connecting the optical axis of the lens group and a center of the cylindrical portion between the positions.

8 Claims, 6 Drawing Sheets

(a)

(b)

DIRECTION TO SUBJECT
DIRECTION TO IMAGE - PICKUP DEVICE (c)

(a)

(b)

DIRECTION TO SUBJECT

DIRECTION TO IMAGE - PICKUP DEVICE (c)

LENS BARREL, IMAGE-PICKUP UNIT HAVING THE LENS BARREL, AND MANUFACTURING METHOD OF THE SAME

This application is based on Japanese Patent Application No. 2004-337241 filed on Nov. 22, 2004 and Japanese Patent Application No. 2004-340261 filed on Nov. 25, 2004 in Japanese Patent Office, the entire content of which is hereby incorporated by reference.

FIELD OF THE INVENTION

The present invention relates to a lens barrel which moves a group of lenses in the optical axis, using a string-formed shape memory alloy element, an image-pickup unit having the lens barrel, and a method of manufacturing the image-pickup unit, wherein this lens barrel is particularly preferable for a small and thin image-pickup unit to be built in a portable terminal and the like.

BACKGROUND OF THE INVENTION

In focusing or zooming of image pickup lenses in a known camera, a group of lenses is usually moved by driving a lens barrel with a motor and a series of gears connected with the motor. On the other hand, cameras are presented which move a group of lenses by the use of a shape memory alloy element, thereby achieving a space saving in a camera, instead of using a motor and a series of gears connected with the motor to move the group of lenses.

As a driving device using a shape memory alloy element, as described above, there are disclosed driving devices which have a detecting means for detecting the position of a driven object and control driving of the shape memory alloy element, based on information by the detecting means, and there are also disclosed driving devices which divide a shape memory alloy element in a string form in the longitudinal direction and individually control the divided elements to perform the position control of a driven object (for example, Patent Document 1).

Further, a driving mechanism is disclosed which uses a shape memory alloy element in a string form, making it into a dogleg shape, wherein the alloy element contacts with a driven object at the approximate central portion of the alloy element and is fixed at the both ends (for example, Patent Document 2).

[Patent Document 1] TOKKAI No. H10-307628
[Patent Document 2] TOKKAI No. 2002-99019

In recent years, a small and thin image-pickup unit is mounted on a portable phone or a small and thin electronic device, such as a PDA, realizing transmission of image information as well as audio information to and from a remote site.

As such portable terminals are used increasingly, with respect to image-pickup units to be built in a portable terminal, those which move a lens group to have not only a macro function but also an AF function and optical zooming function are coming to be mounted so as to obtain images in a higher image quality.

However, an image-pickup unit to be built in a portable terminal is required to be extremely small sized, for example, to have a volume of 1 cm$^3$ or smaller.

With such a requirement, although a driving device, disclosed in above Patent Document 1, having means for position detection of a driven object has the advantage of accurate position control of the driven object, it has the drawback of requiring a space for the detecting means when it is applied to an image-pickup unit to be built in a portable terminal, and accordingly the image-pickup unit becomes large. Further, a driving device, which has shape memory alloy element divided along the longitude direction and performs individual control of the divided shape memory alloy elements, has a complicated circuit configuration for control, and the shape memory alloy elements are linearly disposed, which does not allow the device to be small.

Further, a unit, disclosed in above Patent Document 2, which uses string formed memory alloy elements formed in a dogleg shape has not a significant problem in being built in a large device, such as binoculars. However, fixing portions at both ends stick out much on the both sides of a driven object, which requires a solution to be applied to a small sized image-pickup unit to be built in a portable terminal. Still further, the unit, disclosed in above Patent Document 2, which uses string formed shape memory alloy elements also includes position-detecting means. As it is difficult to perform accurate position control without the detecting means, the unit also has a drawback of making the image-pickup unit large.

Yet further, if it is attempted to move a lens group by the use of a shape memory alloy element in an image-pickup unit built in a small sized portable terminal as described above, there is no space for detecting means, for position detection of the lens group, to be built in. Yet further, if there is variation in the lengths of built-in shape memory alloy elements, the variation causes a problem of variation in shrinking amounts and variation in positions of lens groups if a same driving method is applied.

SUMMARY OF THE INVENTION

To solve such problems, an object of the invention is to provide a lens barrel for focusing by moving a lens group with a shape memory alloy element, wherein the lens barrel has a high volume efficiency with a minimum front area to be used for a small and thin image-pickup unit which is preferable to be built in a portable terminal.

Further, another object of the invention is to provide a small and thin lens barrel which does not need detecting means in moving a lens group by the use of a shape memory alloy element, and can make the focus on a predetermined distance from a subject by the same driving method even if there is variation in the lengths of built-in shape memory alloy element, and to provide an image-pickup unit which has the lens barrel and is preferable to be built in a portable terminal.

To attain such objects, the invention includes the following structures and a method.

A lens barrel which includes a lens group that conducts light from a subject, a lens shell that holds the lens group, a string-formed shape memory alloy element that moves the lens shell in a direction of an optical axis, and a pair of guide shafts formed approximately in parallel to the optical axis of the lens group, wherein the lens shell is integrally formed with a cylindrical portion through which one of the guide shafts penetrates, the string-formed shape memory alloy element contacts with a portion of the lens shell at an approximately central portion of the alloy element, and both ends of the alloy element are fixed at respective positions, with a line connecting the optical axis of the lens group and a center of the cylindrical portion between the positions.

A lens barrel which includes a lens group that conducts light from a subject, a first lens shell that contains the lens group, a second lens shell that holds the first lens shell movably in a direction of an optical axis of the lens group, a pressing member that presses the second lens shell in a direction approximately parallel to the optical axis of the lens group, a shape memory alloy element that moves the second lens shell in the direction of the optical axis of the lens group, a bottom plate that fixes the shape memory alloy element, and a contact member that is disposed on the bottom plate and contacts with a portion of the second lens shell, wherein a position of a contact portion of the contact member is adjustable.

An image-pickup unit manufacturing method which includes a process that moves a second lens shell which holds a first lens shell containing a lens group for conducting light from a subject movably in a direction of an optical axis of the lens group, wherein a shape memory alloy element fixed to a bottom plate moves the second lens shell against a pressing member for a predetermined amount approximately parallel to the optical axis of the lens group from a position where the contact member has come in contact with a portion of the second lens shell by being moved. The method also includes a process that performs focusing by moving the first lens shell with respect to the second lens shell in the direction of the optical axis of the lens group.

BEST EMBODIMENT OF THE INVENTION

An embodiment of the invention will be described in detail below, but the invention is not limited thereto.

Figure 1:
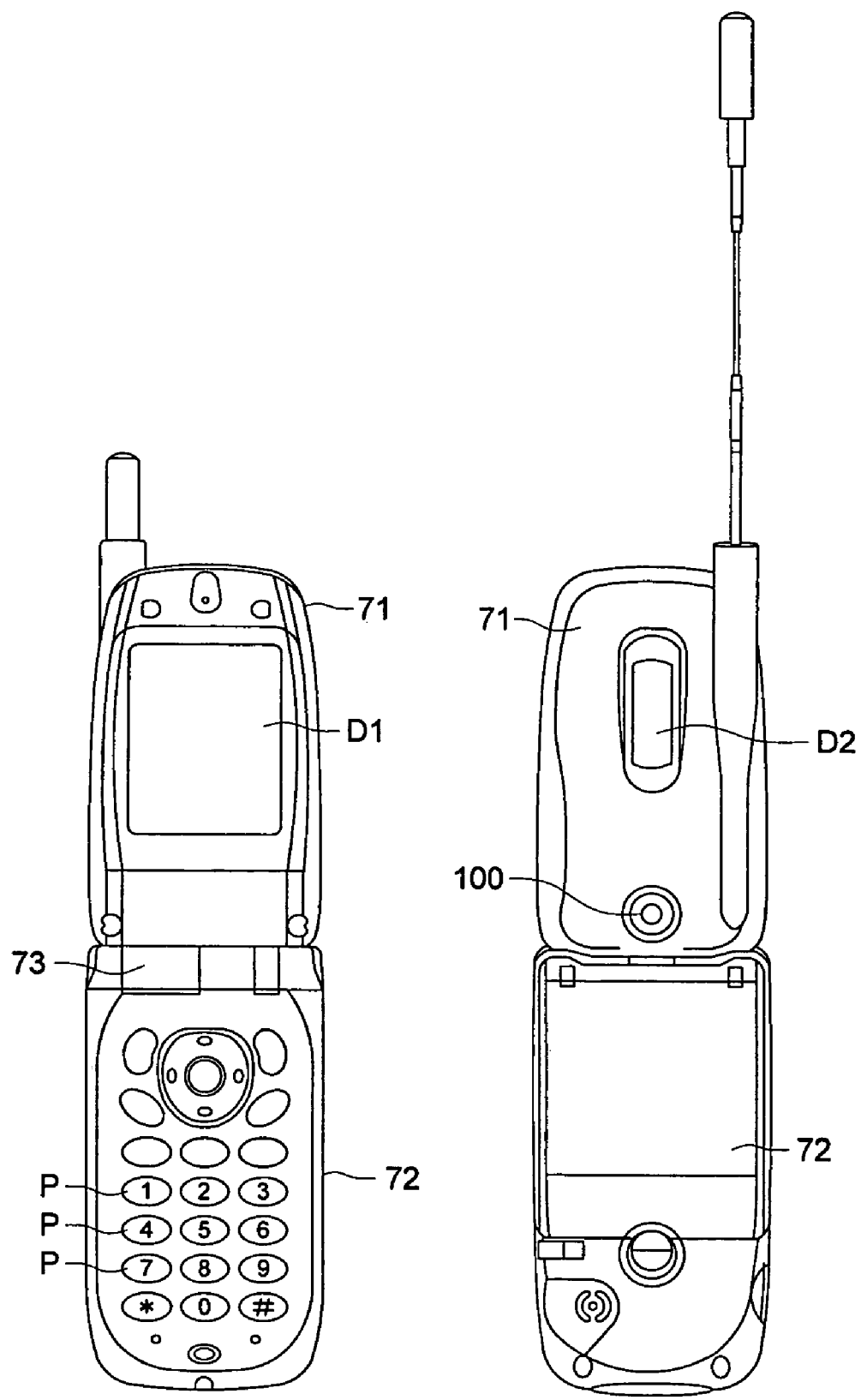
FIG. 1 is a diagram showing the appearance of a portable telephone, which is an example of a portable terminal provided with an image-pickup unit in accordance with an embodiment.

FIG. 1 is a diagram showing the appearance of a portable telephone T, which is an example of a portable terminal provided with an image-pickup unit in accordance with the present embodiment.

The portable telephone shown in the figure is structured such that an upper casing 71, as a casing provided with display screens D1 and D2, and a lower casing 72 provided with operation buttons P are connected through a hinge 73. An image-pickup device 100 is built in under the display screen D2 in the upper casing 71, and the image-pickup device 100 is disposed to be able to take in light from the front surface side of the upper casing 71.

Herein, the image-pickup unit 100 may be disposed above the display screen D2 or at a side face. It is apparent that the portable telephone is, not limited to a folding type.

Figure 2:
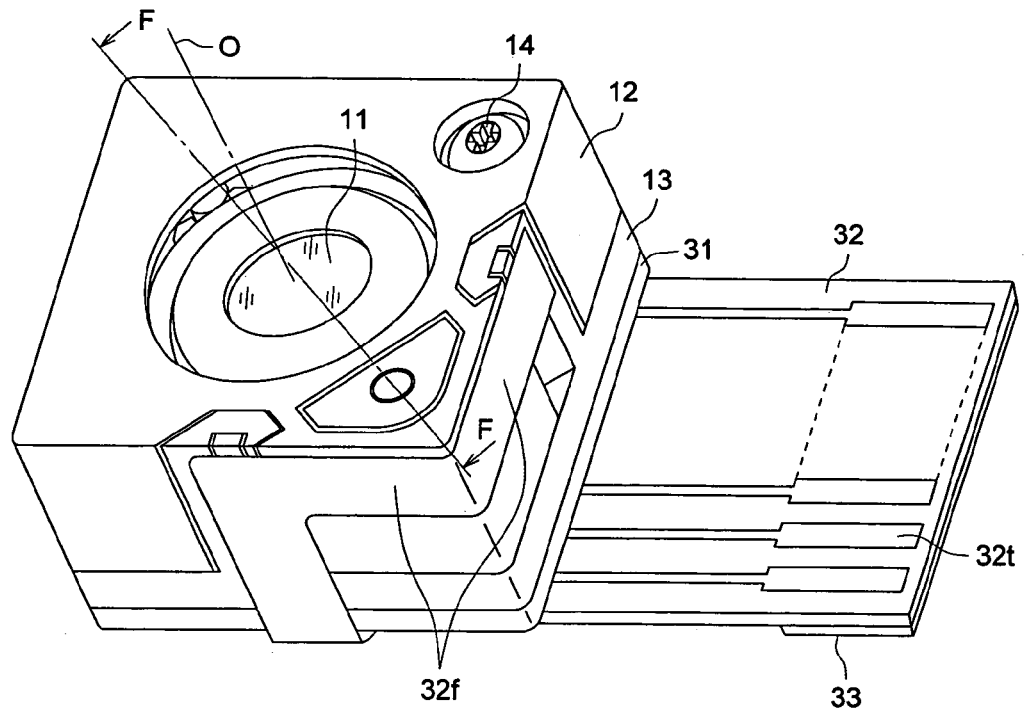
FIG. 2 is an isometric view showing the image-pickup unit in a unit state in accordance with the embodiment.

FIG. 2 is an isometric view showing the image-pickup unit in a unit state in accordance with the present embodiment.

As shown in the figure, the outer surface of the image-pickup unit in accordance with the embodiment is constructed by a lid member 12 provided with an opening so that a lens grope 11 can take in light from a subject, a bottom plate board 13 to which the lid member 12 is fixed with a screw 14, the bottom plate holding respective members disposed inside, a print board 31 in which an image-pickup device is mounted, the print board 31 being fixed to the lower surface of the bottom plate 13, and a flexible print board 32 connected to the print board 31. Further, a flexible print board 32f for supplying a current to a shape memory alloy element described later is arranged. This flexible board 32f may be integrated with the flexible print board 32 and may be arranged separately.

Herein, the flexible print board 32 is formed with contact portions 32t so as to connect the flexible print board 32 with other print boards of the portable terminal, and a reinforcing plate 22 is attached to the back face of the flexible print board 32 with glue. The line O is the optical axis of the lens group 11. Twenty or more contact portions 32t are provided as pins for power supply, control signals, image signal outputs, an input terminal to the shape memory alloy element, and others, wherein the figure shows them schematically.

Next, the inner structure of the image-pickup unit in association with the present embodiment will be described, referring to FIGS. 3, 4 and 5. In the description in the following figures, the same symbols are given to members having the same functions.

Figure 3:
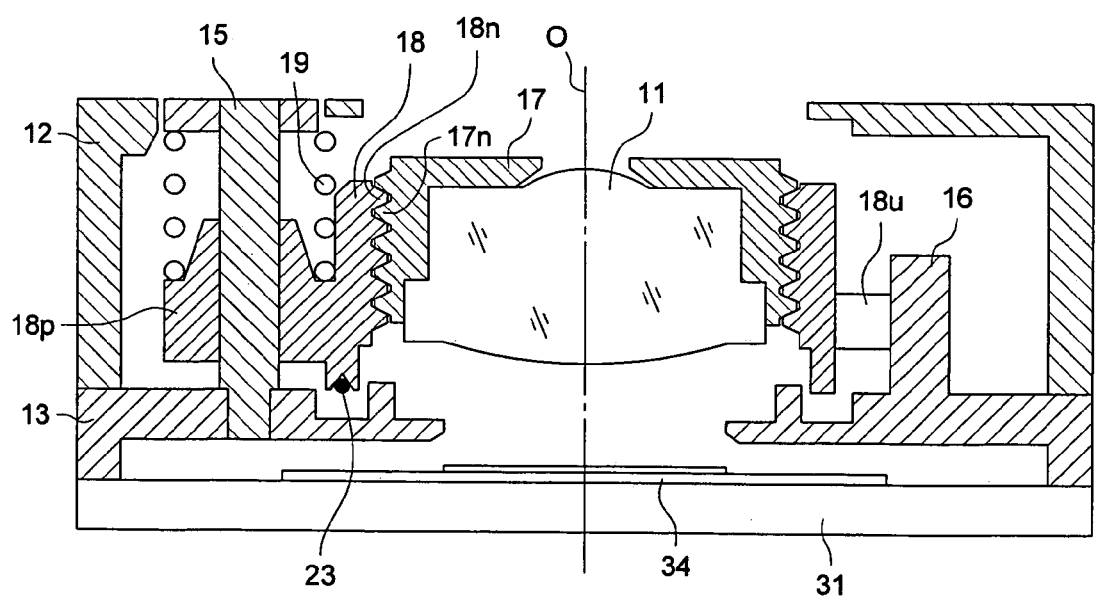
FIG. 3 is a cross sectional view showing the inner structure of the image-pickup unit.

FIG. 3 is a cross sectional view showing the inner structure of the image-pickup device. The figure shows the cross section of the lens barrel inside the image-pickup unit cut by line F-F shown in FIG. 2.

Figure 4:
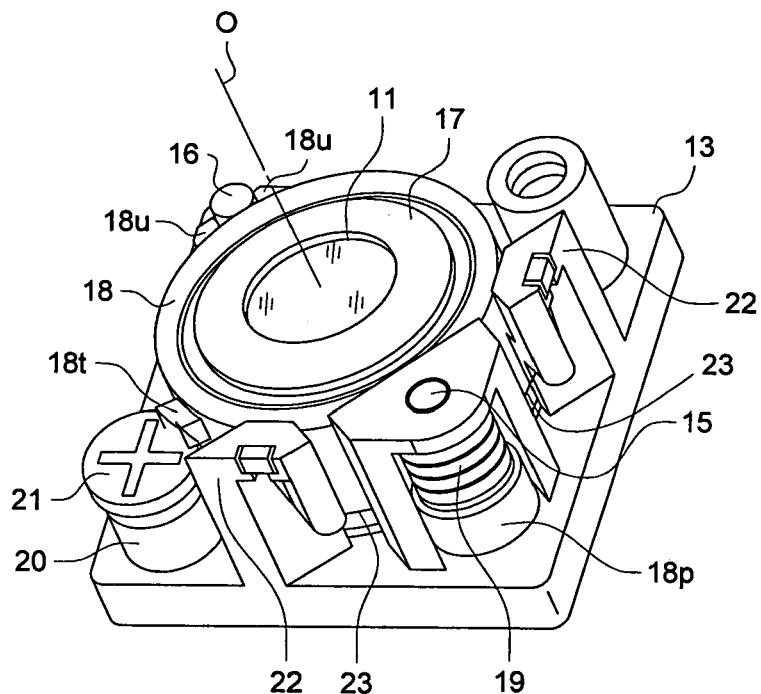
FIG. 4 is an isometric view showing a lens barrel inside the image-pickup unit.

FIG. 4 is an isometric view showing a lens barrel inside the image-pickup unit. The figure shows the state where the lid member 12, print board 31, and flexible boards 32 and 32f are removed form the image-pickup unit 100.

Figure 5:
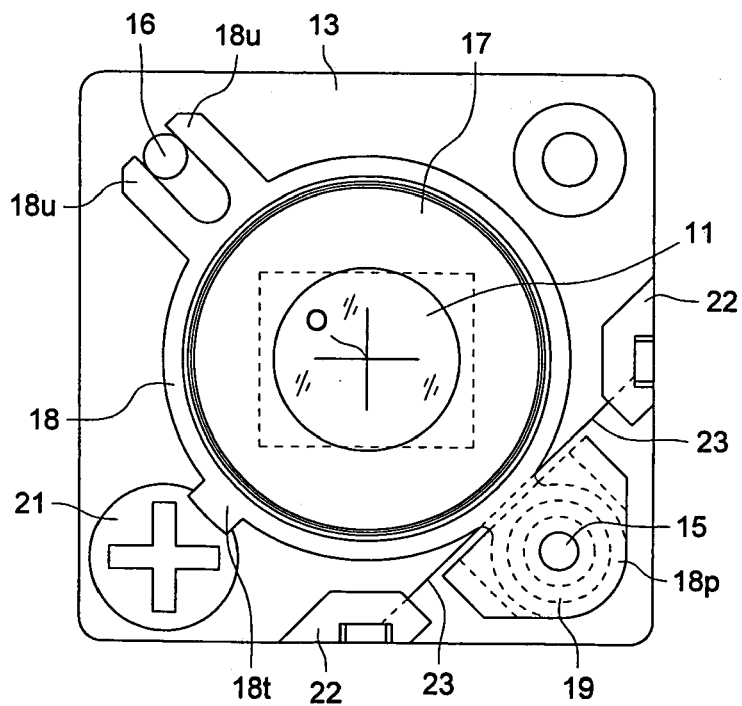
FIG. 5 is a front view showing the dispositions of respective parts of the lens barrel in the image-pickup unit.

FIG. 5 is a front view showing the dispositions of respective parts of the lens barrel in the image-pickup unit. The figure shows a view of them when the lens barrel shown in FIG. 3 is viewed from the subject side in the optical axis O.

The lens barrel inside the image-pickup unit 100 includes the first lens shell 17 (hereinafter, also referred to as lens shell 17) containing the lens group 11 being a single or plural lenses and the second lens shell 18 (hereinafter, also referred to as lens shell 18) for support of the lens shell 17 from outside the lens shell 17. That is, the lens shells 17 and 18 support the lens group 11.

The lens shells 17 and 18 are screwed to each other with screw portions 17n and 18n, and the lens shell 17 is rotated to be moved in the direction of the optical axis O with respect to the lens shell 18. The lens shells 17 and 18 may be relatively movable in the direction of the optical axis O by a helicoid or the like.

The bottom plate 13 is formed approximately in a rectangular shape when viewed from the direction of the optical axis O. Further, a guide shaft 15 is planted on the bottom plate 13 approximately in parallel to the optical axis O and a guide shaft 16 is formed integrally with the bottom plate 13, the guide shafts 15 and 16 being disposed at diagonal positions with the optical axis O therebetween. Herein, the guide shaft 15 may also be formed integrally with the bottom plate 15, and the guide shaft 16 may also be planted.

The lens shell 18 is formed integrally with a barrel portion 18p through which the guide shaft 15 penetrates, and formed with an engaging portion 18u in a U-shape which engages with the guide shaft 16. Thus, the lens shell 18 is movable in the optical axis direction along the guide shafts 15 and 16, and also, the lens shell 17 and the lens group 11 are movable together with the lens shell 18 in the optical axis direction. The barrel portion 18p is pressed by a compressive coil-spring 19, which is a pressing member, in the direction of the axis of the guide shaft 15. In the present example, the barrel portion 18p is pressed to the side of an image-pickup device 34 disposed behind the lens group 11.

Further, a protrusion 18t is formed integrally with the side face of the lens shell 18. The bottom plate 13 is formed with a boss 20, and a screw 21 is fitted to a hole, not shown, of the boss 20. The protrusion 18t is in contact with the top of the screw 21. That is, the lens shell 18 is pressed to the image-pickup device side by the compressive spring 19, which is the pressing member, and the position of the lens shell 18 on the side of the image-pickup device 34 is defined in such a manner that the protrusion 18t is in contact with the top of the screw 21, which is the contact member disposed on the bottom plate 13.

Further, the bottom plate 13 is integrally formed with two pole-shaped portions 22, wherein the two pole-shaped portions are formed at positions, with the line connecting the optical axis O of the lens group 11 and the center of the barrel portion 18p between the positions. The both ends of the string formed shape memory alloy element 23 are fixed at the upper portions of the two respective pole-shaped portions 22, and the string formed shape memory alloy element 23 is stretched between the optical axis O of the lens group 11 and the barrel portion 18p in contact with the lower portion, of the lens shell 18, on the side of the image-pickup device 34.

In this way, inside the approximate rectangular shape which is the view of the bottom plate 13 form the front side, the guide shafts 15 and 16 are disposed on the approximately diagonal positions, with the optical axis O therebetween, and the both ends of the string formed shape memory alloy element 23 are fixed at the upper portions of the respective pole-shaped portions 22 provided at the positions, wherein the line connecting the optical axis O of the lens group and the center of the barrel portion 18p are between these positions. Thereby, the front area can be minimized compared with cases of other dispositions.

Figure 6:
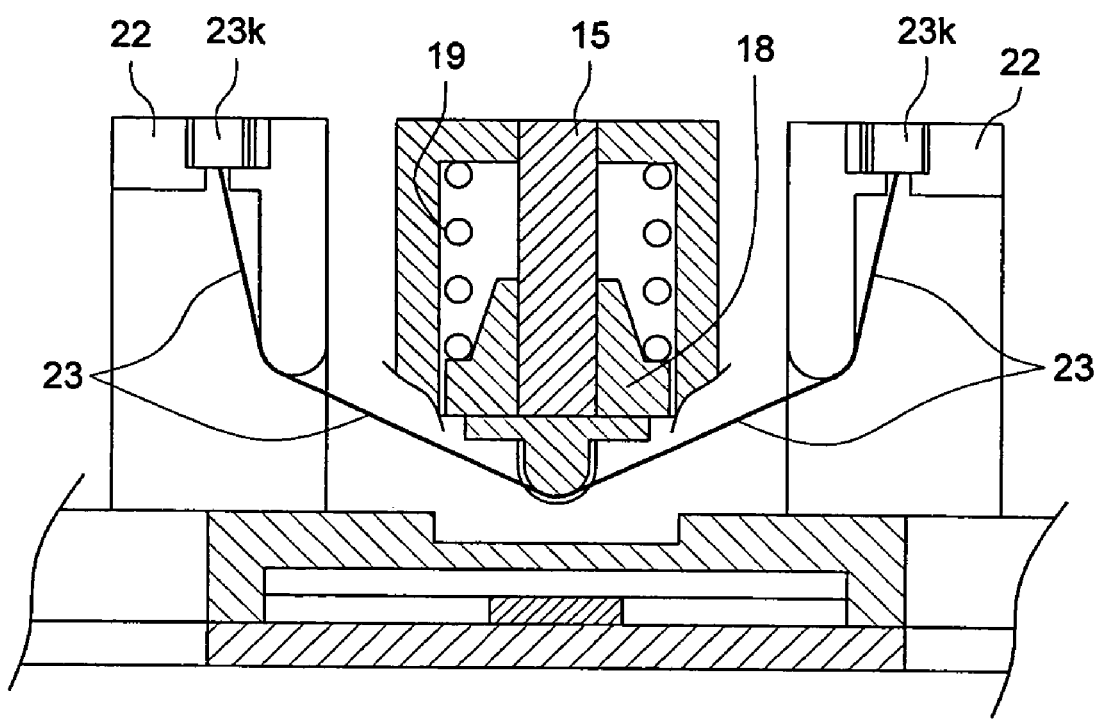
FIG. 6 is a schematic diagram showing the relations between respective parts, wherein a string formed shape memory alloy element is stretched.

FIG. 6 is a schematic diagram showing the relations between respective parts, wherein a string formed shape memory alloy element is stretched.

As shown in the figure, the both ends of the string formed shape memory 23 are fixed at the upper portions of the two pole-shaped portions 22 which is integrally formed with the bottom plate 13. The shape memory alloy element 23 is stretched in such a manner that the angles from the both fixing portions are symmetrically changed at respective certain parts of the pole-shaped portions 22, and thereafter, the shape memory alloy element 23 is in contact with the lower portion of the lens shell 18 at the approximately central portion of the shape memory alloy element 23.

Further, the both ends of the shape memory alloy element 23 are nipped by plate members 23k and cut there, wherein the plate members 23k are fixed to the respective upper parts of the pole-shaped portions 22.

A predetermined current is supplied to the shape memory alloy element 23, which is stretched in the way described above, from the flexible print board 32f, shown in FIG. 2, through the plate members 23k so that the shape memory alloy element 23, which is a resistor, generates heat and the temperature rises, and then the total length changes to become shorter, namely, shrinks. Thus, the lens shell 18 is moved in the direction of the optical axis O along the guide shafts 15 and 16 against the compressive coil spring 19, which is a pressing member. That is, the lens group 11 supported by the lens shells 17 and 18 moves in the direction to the subject along the optical axis O, which allows focusing on a closer distance.

The current value to be supplied to the shape memory alloy element 23 may take a single value, or may take plural values to drive the lens group 11 with position selection in the direction of the optical axis O.

The structure of the lens barrel inside the image-pickup unit 100 in accordance with the embodiment has been described above.

As described above, in moving a lens group in the direction of the optical axis, by forming a pair of guide shafts approximately in parallel to the optical axis of the lens group, forming a cylindrical portion, integrally with a lens shell, through which one of the guide shafts penetrates, fixing the both ends of a string-formed shape memory alloy element to positions, wherein the line connecting the optical axis of the lens group and the center of the cylindrical portion are between the fixing positions, and making the shape memory alloy element contact with a portion of the lens shell at the approximately central portion of the shape memory alloy element, it is possible to effectively use the inner space and minimize the necessary volume and front area, thereby obtaining a lens barrel for a small and thin image-pickup unit.

Further, by making the shape memory alloy element contact with the lens shell between the optical axis of the lens group and the cylindrical portion, the lens shell can be smoothly moved in the direction of the optical axis.

Although in the present embodiment, a lens shell, which is divided into the first shell and second shell, is used, it is apparent that the first lens shell, the second lens shell, and the lens group may be structured integrally.

Next, for a case of using a lens shell divided in the first lens shell and the second lens shell as in the present embodiment, the method of adjusting the respective parts of the image-pickup unit 100 after the string-formed shape memory alloy element 23 is fitted will be described. This aims at driving the position of the lens group 11 at the time of shrinkage of the shape memory alloy element 23 by the same driving method, stably without individual variation.

Figure 7:
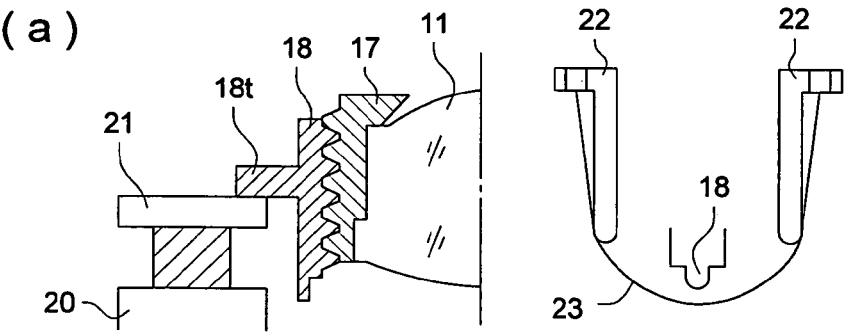
FIG. 7 is a schematic diagram showing an example of adjusting orders of the respective parts after the string formed memory alloy element is fitted and showing the state of respective parts related then.
Figure 7:
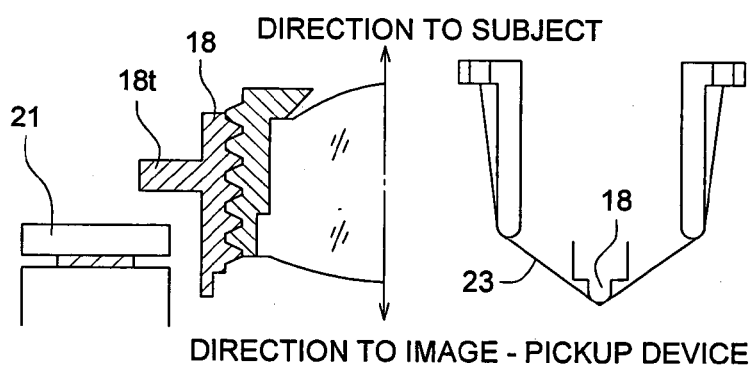
Figure 7:
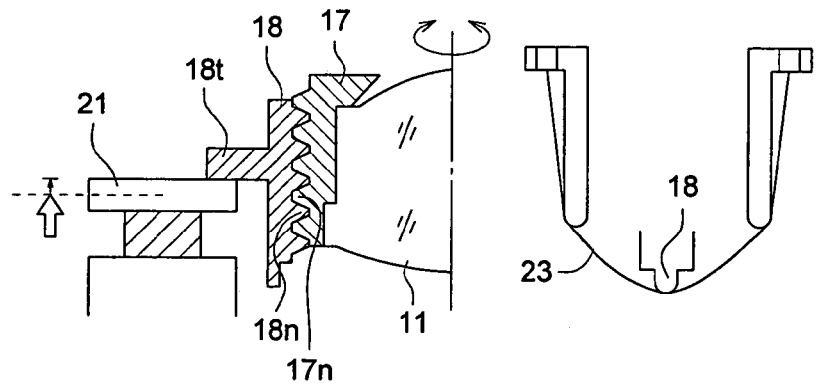

FIG. 7 is a schematic diagram showing an example of adjusting orders of the respective parts after the string formed memory alloy element is fitted and showing the state of respective parts related then. The figure shows extraction of the relationship between the screw 21 being a contact member and the protrusion 18t formed on the second lens shell 18 and the relationship between the shape memory alloy element 23 and the second lens shell 18. Herein, the following adjustment is performed, removing the lid member 12 from the image-pickup unit 100 shown in FIG. 1, as in the state where the inner portion of the image-pickup unit 100 is exposed as shown in FIG. 4, and fitting the image-pickup unit 100 to a jig.

First, as shown in (a) in FIG. 7, after moving the screw 21 being a contact member upward by rotation, the both ends of the shape memory alloy element 23 are fixed to the pole-shaped portions 22, and the second lens shell 18, the pressing member 19, and the guide shaft 15 (see FIG. 4) are assembled. At this moment, since the screw 21 is located at the upper position, the screw 21 and the protrusion 18*t* contact each other, as shown, and the shape memory alloy element 23 and the lens shell 18 do not contact each other in the state where the shape memory alloy element 23 is slack, as shown.

Next, as shown in (b) of FIG. 7, the screw 21 is rotated down until the screw 21 and the protrusion 18*t* are separated from each other. Accordingly, the second lens shell 18 is moved by the pressing member 19 in the direction to the image-pickup device to come in contact with the shape memory alloy element 23 and stops at the position where the pressing force of the pressing member 19 and the tension of the shape memory alloy element 23 become in balance with each other.

Though not shown, the jig is provided with a detector to detect the position of the second lens shell 18. This detector is preferably a non-contact type. For example, it is possible to apply a detector which irradiates a laser beam onto the surface, on the subject side, of the second lens shell 18 and receives the reflected light, thus measuring the distance between the detector and the subject (in this case, the surface of the lens shell 18 on the subject side) by the principle of triangulation. A position where the output of the detector stops changing is the stopping position of the second lens shell 18.

Next, as shown in (c) of the figure, the screw 21 is rotated upward to move back the protrusion 18*t* for a predetermined distance toward the direction of the subject against the pressing member 19 from the position (shown by the dashed line) where the top of the screw 21 and the protrusion 18*t* have come in contact with each other. This operation can be performed for the same backing distance without individual variation, for example, by stopping moving out the screw 21 at the position where the output value has changed for a predetermined amount toward the subject from an output value at which the output value by the above-described detector stopped changing. Thus, the shape memory alloy element 23 can be brought into the state where a desired tension is applied, in contact with the second lens shell 18, as shown. This backing amount to be used is determined by an experiment in advance.

By the adjustment described above, the tension applied to the shape memory alloy element 23 can be approximately uniform even with variation in the lengths of fitted string-formed shape memory alloy element 23.

Further, the first lens shell 17 is rotated with respect to the second lens shell 18; the first lens shell 17, in other words, the lens group 11 is moved in the direction of the optical axis by the screw portions 17*n* and 18*n*; focusing is performed on the image-pickup surface of the image-pickup device, not shown; and thereafter, the first lens shell 17 is fixed to the second lens shell 18 by adhesion or the like. This focusing is preferably performed, for example, on infinity or a hyperfocal distance. This focusing may be performed by the use of a collimator or by obtaining the focus position with evaluation of an output from the image-pickup device each time the lens group is moved.

An example of adjusting orders of the respective parts of the image-pickup unit 100 has been described above.

In such a manner, length error of the fitted shape memory alloy element 23 is absorbed and the tension applied to the shape memory alloy element 23 is made to be approximately uniform. Thus, a stable shrinking amount is obtained by applying current through the shape memory alloy element 23 so that the lens group 11 can be moved to a desired position by the same driving method, and thereby a manufacturing method of a small and thin image-pickup unit which allows focusing on a predetermined distance of a subject is obtained.

Figure 8:
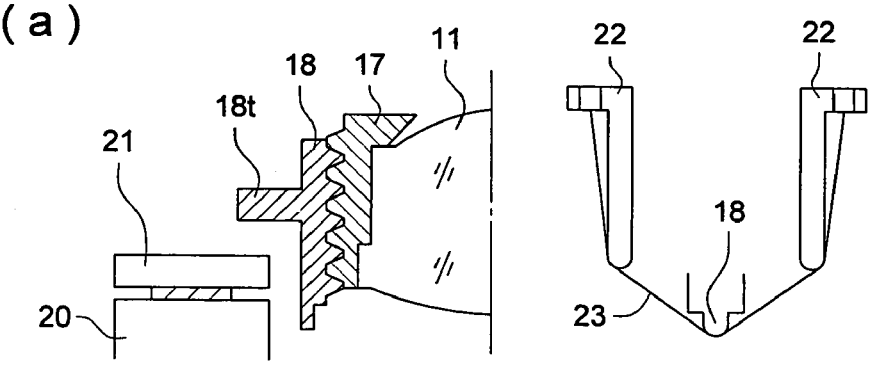
FIG. 8 is a schematic diagram showing another example of adjusting orders of the respective parts after the string formed memory alloy element is fitted and showing the state of respective parts related then.
Figure 8:
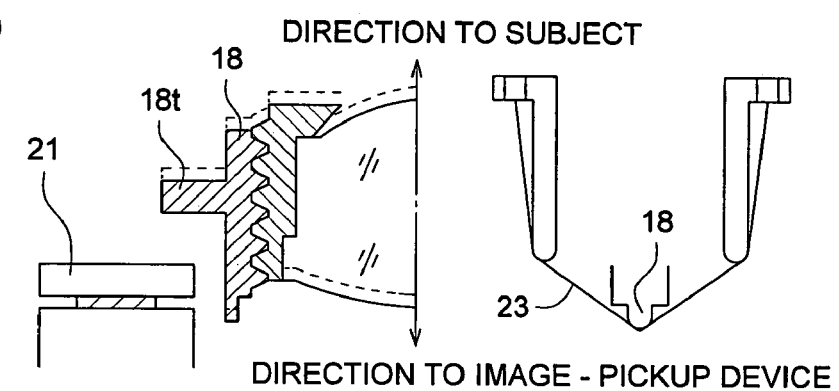
Figure 8:
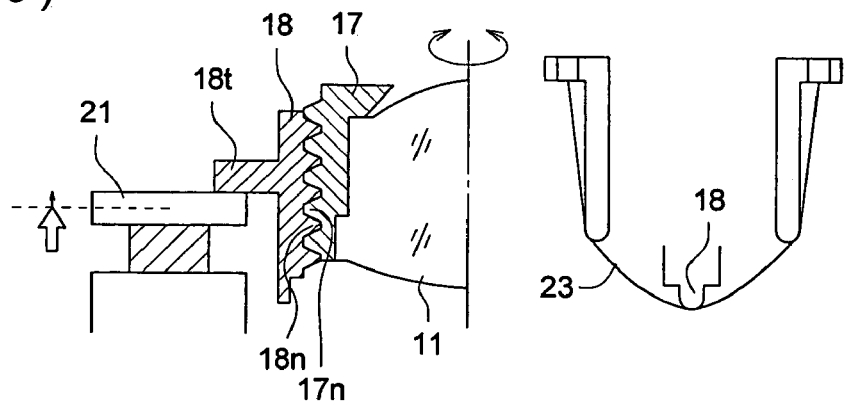

FIG. 8 is a schematic diagram showing another example of adjusting orders of the respective parts after the string formed memory alloy element 23 is fitted and showing the state of respective parts related then. This figure, similarly to FIG. 7, shows extraction of the relationship between the screw 21 being a contact member and the protrusion 18*t* formed on the second lens shell 18 and the relationship between the shape memory alloy element 23 and the second lens shell 18. Herein, the following adjustment is also performed similarly, removing the lid member 12 from the image-pickup unit 100 shown in FIG. 1, as in the state where the inner portion of the image-pickup unit 100 is exposed as shown in FIG. 4, and fitting the image-pickup unit 100 to a jig.

First, as shown in (a) in FIG. 8, after moving the screw 21 being a contact member downward by rotation, the both ends of the shape memory alloy element 23 are fixed to the pole-shaped portions 22, and the second lens shell 18, the pressing member 19, and the guide shaft 15 (see FIG. 4) are assembled. At this moment, since the screw 21 is located at the lower position, the shape memory alloy element 23 and the lens shell 18 contact each other, as shown.

Next, if a current is applied through the shape memory alloy element 23, it shrinks, as shown in (b) of FIG. 8, and the second lens shell 18 is moved toward the direction of the subject, shown by the dashed line, against the pressing member 19. Herein, this current is applied in a current value of approximately the same with the maximum current value during usage.

If the current through the shape memory alloy element 23 is cut thereafter, the second lens shell 18 moves toward the image-pickup device, and the pressing force of the pressing member 19 and the shape memory alloy element 23 become in balance when the second lens shell 18 stops at the position shown by the solid line.

Though not shown, the jig is provided with a detector to detect the position of the second lens shell 18. This detector is preferably a non-contact type. For example, it is possible to apply a detector which irradiates a laser beam onto the surface, on the subject side, of the second lens shell 18 and receives the reflected light, thus measuring the distance between the detector and the subject (in this case, the surface of the lens shell 18 on the subject side) by the principle of triangulation. A position where the output of the detector stops changing is the stopping position of the second lens shell 18.

Next, as shown in (c) of the figure, the screw 21 is rotated upward to move back the protrusion 18*t* for a predetermined distance toward the direction of the subject against the pressing member 19 from the position (shown by the dashed line) where the top of the screw 21 and the protrusion 18*t* contact each other. This operation can be performed for the same backing distance without individual variation, for example, by stopping moving out the screw 21 at the position where the output value has changed for a predetermined amount toward the subject from an output value at which the output value by the above-described detector stopped changing. Thus, the shape memory alloy element 23 can be brought into the state where a desired tension is applied, in contact with the second lens shell 18, as shown. This backing amount is determined by experiment in advance to be used.

In such a manner, it is possible to make the tension applied to the shape memory alloy element 23 to be almost uniform even if there is variation in the lengths of fitted string-formed shape memory alloy elements 23 also by the method including a process which applies current through the shape memory alloy element 23 to shrink it so that the second lens shell 18 moves in the direction of the optical axis against the pressing member 19 prior to the process which moves the second lens shell 18 for a predetermined amount against the pressing member 19 from the position where the screw 21 being a contact member and the protrusion 18t being a part of the second lens shell 18 contact each other.

Further, the first lens shell 17 is rotated with respect to the second lens shell 18; the first lens shell 17, in other words, the lens group 11 is moved in the direction of the optical axis by the screw portions 17n and 18n; focusing is performed on the image-pickup surface of the image-pickup device, not shown; and thereafter, the first lens shell 17 is fixed to the second lens shell 18 by adhesion or the like. This focusing is preferably performed, for example, on infinity or a hyperfocal distance. This focusing may be performed by the use of a collimator or by obtaining the focus position with evaluation of an output from the image-pickup device each time the lens group is moved.

Another example of adjusting orders of the respective parts of the image-pickup unit 100 has been described above.

Also, in such a manner, length error of the fitted shape memory alloy element 23 is absorbed and the tension applied to the shape memory alloy element 23 is made to be approximately uniform. Thus, a stable shrinking amount is obtained in applying current through the shape memory alloy element 23 so that the lens group 11 can be moved to a desired position by the same driving method, and thereby a manufacturing method of a small and thin image-pickup unit which allows focusing on a predetermined distance of a subject is obtained.

By the manufacturing method described above, referring to either FIG. 7 or FIG. 8, it is possible to move a lens group to a desired position by the same driving method which does not require individual response in applying current through a shape memory alloy element fitted in an image-pickup unit, without providing a detector in the image-pickup unit, thereby obtaining a lens barrel for a small and thin image-pickup unit and an image-pickup unit provided with this lens barrel preferable to be built in a portable terminal.

The invention includes the following structures and methods.

Item 1) A lens shell that has a lens group for conducting light from a subject and a lens shell for holding the lens group and moves the lens shell along the optical axis of the lens group by the use of a string-formed shape memory alloy element, wherein the lens shell includes a pair of guide shafts formed approximately parallel to the optical axis of the lens group, the lens shell is integrally formed with a cylindrical portion through which one of the guide shafts penetrates, the string-formed shape memory alloy element contacts with a portion of the lens shell at an approximate central portion of the alloy element, and the both ends of the alloy element are fixed at positions, with the line connecting the optical axis of the lens group and the center of the cylindrical portion between the positions.

Item 2) The lens barrel of Item 1, wherein a pressing member presses the cylindrical portion in a direction of an axis of the one of the guide shafts.

Item 3) The lens barrel of Item 1 or 2, wherein an outline of the lens barrel is approximately a rectangular when viewed from the direction of the optical axis, and the guide shafts are disposed at approximately diagonal positions having the optical axis between the positions.

Item 4) An image-pickup unit including the lens barrel of any one of Items 1 to 3.

Item 5) A lens barrel including a lens group that conducts light from a subject, a first lens shell that contains the lens group, a second lens shell that holds the first lens shell movably in a direction of an optical axis of the lens group, a pressing member that presses the second lens shell in a direction approximately parallel to the optical axis of the lens group, a shape memory alloy element that moves the second lens shell in the direction of the optical axis of the lens group, and a bottom plate that fixes the shape memory alloy element, wherein a contact member which contacts with a portion of the second lens shell is disposed on the bottom plate, and the position of a contact portion of the contact member is adjustable.

Item 6) The lens barrel of Item 5, including an image-pickup device that photoelectrically converts the light from the subject conducted by the lens group, wherein the pressing member presses the second lens shell toward the image-pickup device.

Item 7) The lens barrel of Item 5 or 6, wherein the shape memory alloy element contacts with the portion of the second lens shell at an approximately central portion of the alloy element with both ends of the alloy element fixed to the bottom plate, and the position of the contact member is adjusted from a position where the second lens shell stops in balance with pressing force of the pressing member to a position where the second lens shell is moved back for a predetermined amount against the pressing force of the pressing member.

Item 8) An image-pickup unit, including the lens barrel of any one of Items 5 to 7.

Item 9) A method of manufacturing an image-pickup unit which includes a lens group that conducts light from a subject, a first lens shell that contains the lens group, a second lens shell that holds the first lens shell movably in the direction of an optical axis of the lens group, a pressing member that presses the second lens shell in a direction approximately parallel to the optical axis of the lens group, a shape memory alloy element that moves the second lens shell in the direction of the optical axis of the lens group, a bottom plate that fixes the shape memory alloy element, and a contact member that is disposed on the bottom plate and contacts with a portion of the second lens shell, the method including a process that moves the contact member and moves the second lens shell from a position where the contact member and the portion of the second lens shell have come in contact with each other, for a predetermined amount against the pressing member, and a process that performs focusing by moving the first lens shell with respect to the second lens shell in the direction of the optical axis of the lens group.

Item 10) The manufacturing method of an image-pickup unit of Item 9, the method including a process that moves the contact member upward to make the shape memory alloy element to be slack, prior to the process that moves the second lens shell for the predetermined amount against the pressing member from the position where the pressing member has come in contact with the portion of the second lens shell by being moved, and the method including a process that separates the contact member and the second lens shell, makes the shape memory alloy element and the second lens shell contact with each other, and stops the second lens shell at a position where the pressing force of the pressing member and the shape memory alloy element come in balance.

Item 11) The manufacturing method of an image-pickup unit of Item 9, the method including a process that shrinks the shape memory alloy element by applying current through the alloy element to move the second lens shell in the direction of the optical axis against the pressing member, prior to the process that moves the second lens shell for the predetermined amount against the pressing member from the position where the contact member has come in contact with the portion of the second lens shell by being moved, and the method including a process that cuts off the current through the shape memory alloy element and stops the second lens shell at a position where the pressing force of the pressing member and the shape memory alloy element come in balance.

According to any one of Items 1 to 3, it is possible to minimize the volume and the front area so as to obtain a small and thin lens barrel that moves a lens group by the use of a shape memory alloy element to perform focusing.

According to Item 4, it is possible to obtain a small and thin image-pickup unit which is preferable to be built in a portable terminal.

According to any one of Items 5 to 7, it is possible to obtain a small and thin lens barrel which does not need detecting means in moving a lens group by the use of a shape memory alloy element, and can make the focus on a predetermined distance from a subject by the same driving method even if there is variation in the lengths of built-in shape memory alloy-elements.

According to Item 8, it is possible to obtain an image-pickup unit, which has a lens barrel having the above effect, and is preferable to be built in a portable terminal.

According to any one of Items 9 to 11, it is possible to obtain a method for manufacturing a small and thin image-pickup unit which does not need detecting means in moving a lens group by the use of a shape memory alloy element, and can make the focus on a predetermined distance from a subject by the same driving method even if there is variation in the lengths of built-in shape memory alloy elements.

What is claimed is:

1. A lens barrel comprising:
   a lens group that conducts light from a subject;
   a lens shell that holds the lens group;
   a string-formed shape memory alloy element that moves the lens shell in a direction of an optical axis; and
   a pair of guide shafts formed approximately in parallel to the optical axis of the lens group, wherein
   the lens shell is integrally formed with a cylindrical portion through which one of the guide shafts penetrates, wherein the guide shafts guide movement of the lens shell;
   the string-formed shape memory alloy element contacts with a portion of the lens-shell at an approximately central portion of the alloy element;
   both ends of the alloy element are fixed at respective positions, wherein a line connecting the optical axis of the lens group and a center of the cylindrical portion is between the positions; and
   a combination of expansion or shrinkage of the string-formed shape memory alloy element and the guidance by the guide shafts moves the portion of the lens shell in contact with the string-formed shape memory alloy element approximately parallel to the optical axis to move the lens shell approximately in the direction of the optical axis.

2. The lens barrel of claim 1, wherein a pressing member presses the cylindrical portion in a direction of an axis of the one of the guide shafts.

3. The lens barrel of claim 1, wherein an outline of the lens barrel is approximately a rectangular when viewed from the direction of the optical axis, and the guide shafts are disposed at approximately diagonal positions, with the optical axis between the positions.

4. An image-pickup unit, comprising the lens barrel of claim 1.

5. The lens barrel of claim 2, comprising an image-pickup device that photoelectrically converts the light from the subject conducted by the lens group, wherein the pressing member presses the second lens shell toward the image-pickup device through the cylindrical portion.

6. A method of manufacturing an image-pickup unit, comprising:
   a process that moves a second lens shell which holds a first lens shell containing a lens group for conducting light from a subject, the second lens shell holding the first lens shell movably in a direction of an optical axis of the lens group, wherein a string-formed shape memory alloy element is moved to transport a contact member to move the second lens shell against a pressing member a predetermined amount approximately parallel to the optical axis of the lens group from a position where the contact member has come in contact with a portion of the second lens shell, the shape memory alloy element being reeved around the contact member and having both ends fixed to a bottom plate so that the shape memory alloy element contacts the contact member at approximately a central portion; and
   a process that performs focusing by moving the first lens shell with respect to the second lens shell in the direction of the optical axis of the lens group.

7. The method of manufacturing method of an image-pickup unit of claim 6, further comprising:
   a first preprocess that moves the contact member upward to make the string-formed shape memory alloy element to be slack, and
   a second preprocess that separates the contact member and the second lens shell, and makes the string-formed shape memory alloy element and the second lens shell contact with each other to stop the second lens shell at a position where the pressing force of the pressing member and tension of the string-formed shape memory alloy element come in into balance;
   wherein the first and second preprocesses are performed prior to the process that moves the second lens shell the predetermined amount against the pressing member from the position where the contact member has come in contact with the portion of the second lens shell.

8. The method of manufacturing an image-pickup unit of claim 6, further comprising:
   a first preprocess that shrinks the string-formed shape memory alloy element by applying a current through the string formed shape memory alloy element to move the second lens shell in the direction of the optical axis against the pressing member, and
   a second preprocess that cuts off the current through the string-formed shape memory alloy element to stop the second lens shell at a position where the pressing force of the pressing member and tension of the string-formed shape memory alloy element come into balance;
   wherein the first and second preprocesses are performed prior to the process that moves the second lens shell the predetermined amount against the pressing member from the position where the contact member has come in contact with the portion of the second lens shell.

* * * * *